United States Patent [19]

Huebotter

[11] 4,316,306
[45] Feb. 23, 1982

[54] METHOD AND APPARATUS FOR HOLDING THE PINCER CARRYING LEG OF A CRAB FOR SPLITTING THE LEG LONGITUDINALLY

[76] Inventor: Otto H. Huebotter, 4111 Floyd, Houston, Tex. 77007

[21] Appl. No.: 178,793

[22] Filed: Aug. 18, 1980

[51] Int. Cl.³ .............................................. A22C 29/02
[52] U.S. Cl. .......................................... 17/52; 17/75; 17/71; 17/48
[58] Field of Search ................... 17/70, 71, 74, 75, 76, 17/73, 52, 48

[56] References Cited

U.S. PATENT DOCUMENTS

| | | |
|---|---|---|
| 943,982 | 12/1909 | Lloyd .................................... 17/76 |
| 3,071,802 | 1/1963 | Gambardella ......................... 17/71 |
| 3,611,478 | 10/1971 | Lockerby ............................... 17/71 |
| 3,878,586 | 4/1975 | Hoppert et al. ........................ 17/70 |

*Primary Examiner*—Willie G. Abercrombie
*Attorney, Agent, or Firm*—Jennings B. Thompson; Marvin B. Eickenroht

[57] ABSTRACT

Apparatus for and a method of holding the pincer carrying leg of a crab for splitting the leg longitudinally is disclosed. The leg is supported against movement from the cutting tool by spaced, parallel, support members that engage the upwardly diverging sides of the inner section of the leg. The leg is held from rotation by clamping the spaced jaw members of the pincers on the end of the outer section of the leg.

5 Claims, 6 Drawing Figures

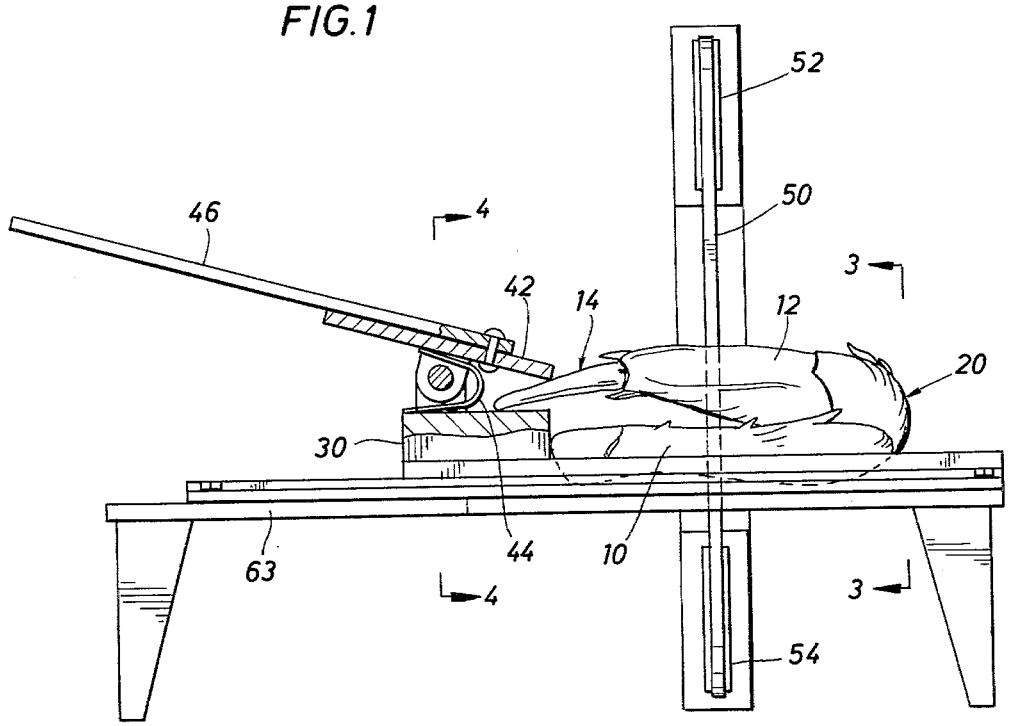
FIG.1
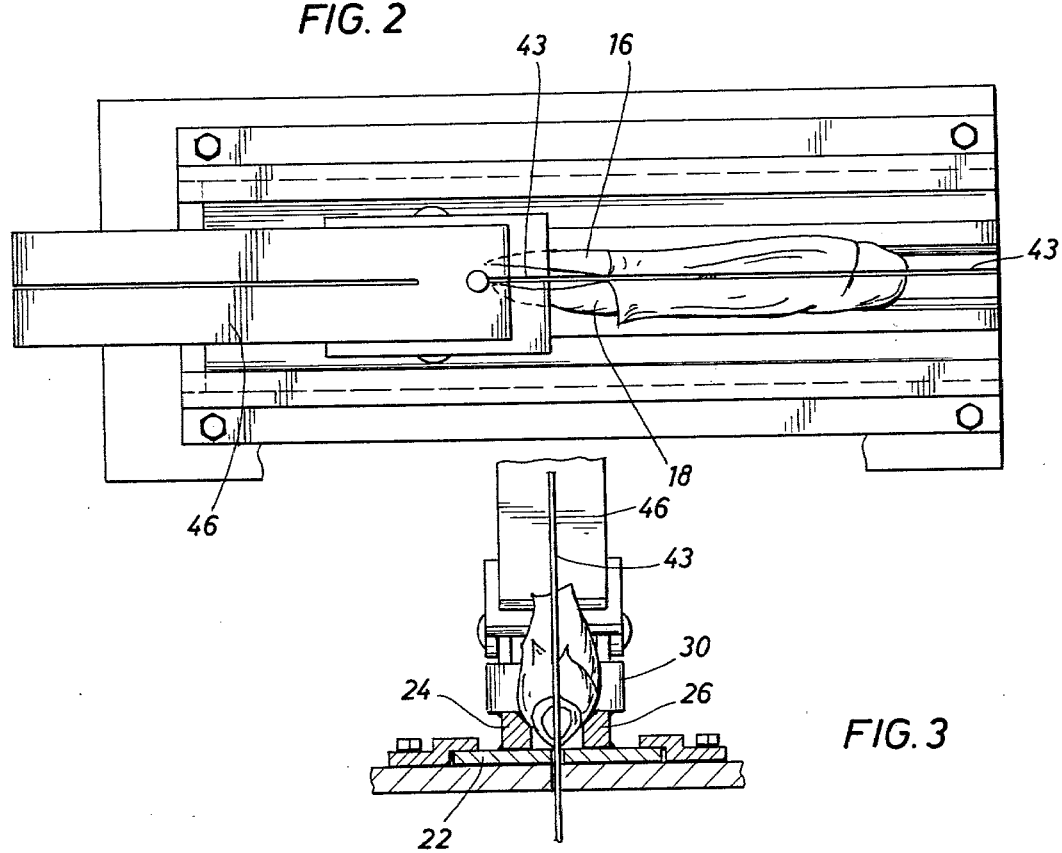
FIG.2
FIG.3

METHOD AND APPARATUS FOR HOLDING THE PINCER CARRYING LEG OF A CRAB FOR SPLITTING THE LEG LONGITUDINALLY

This invention relates to a method of and apparatus for holding the pincer carrying leg of a crab of the blue or Dunginess type so it can be split longitudinally into two halves to allow easy removal of the meat in the leg.

The word crab is applied to any of numerous marine or land crustaceons constituting the suborder brachyura of the order decopoda. Crabs have ten legs. The first or front pair of legs is modified into chelea or pincers. Crabs are caught or trapped for their meat in large numbers by commercial crabbers. In the United States, commercial crab meat is almost exclusively obtained from the common blue crab of the Gulf and Atlantic coast and the Dunginess crab on the Pacific coast.

Commercial crab meat processers remove the meat from the body of the crab in various ways. Removing the crab meat from the body of the crab has always been a difficult task. In my previous U.S. Pat. No. 3,921,256, entitled METHOD AND APPARATUS FOR CLEANING CRABS, which issued on Nov. 25, 1975, I taught a method of and apparatus for quickly and easily removing the crab meat from the body of a crab. There is a substantial amount of meat, however, in the pincer carrying leg of the crab, and there is no satisfactory method of or apparatus for removing this meat at the present time.

Therefore, it is an object of this invention to provide a method of and apparatus for holding the pincer carrying leg of a crab of the blue or Dunginess type so it can be split longitudinally in half to provide easy access to the meat contained in the leg.

It is another object of this invention to provide apparatus for and a method of holding the pincer leg of a crab that includes employing the spaced jaws of the pincer to hold the leg from rotating around the longitudinal axis of the leg so that the leg can be split longitudinally by sawing from the opposite end from the pincers toward the pincers to allow the clamped pincers to hold the leg in position to be split until the saw has passed into the space between the spaced jaws of the pincers.

These and other objects, advantages and features of this invention will be apparent to those skilled in the art from a consideration of this specification, including the attached drawings and appended claims.

In the drawings:

FIG. 1 is a side view partly in elevation and partly in section of the apparatus of this invention holding the pincer carrying leg of a blue crab while it is being split longitudinally into two halves;

FIG. 2 is a top view of the apparatus of FIG. 1;

FIG. 3 is a view taken along line 3—3 of FIG. 1;

Figure 4:
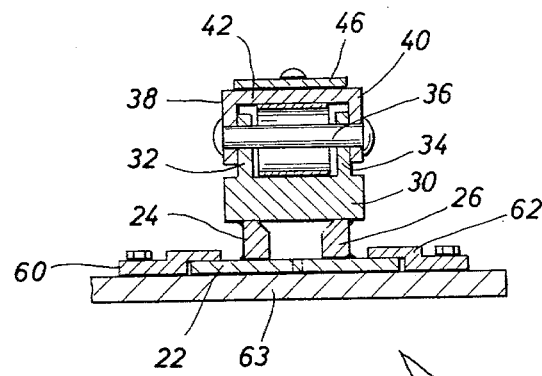
FIG. 4 is a view taken along line 4—4 of FIG. 1.

The pincer carrying leg of the blue crab, as shown in FIG. 1, includes inner section 10 and outer section 12 which is modified at the end into pincers 14. The pincers include stationary jaw 16 and movable jaw 18. Inner and outer sections 10 and 12 are connected by elbow-like joint 20.

The movable jaw is located on the top side of the leg, so the leg shown was located on the right side of the crab. The leg from the left side is a mirror image of the one from the right. The apparatus of this invention operates the same with either leg.

In accordance with the method of this invention, the crab leg is held against movement in the direction of movement of the cutting blade used to split the leg longitudinally and from movement laterally of the direction of movement of the cutting blade. In the embodiment shown, in FIGS. 1 through 4, support means are provided to engage the inner section 10 of the leg to provide such support. The support means includes base 22 and elongated support members 24 and 26 which are mounted on the base. The support members are spaced apart as shown in FIG. 4 to form a sort of trough into which the lower edge of inner section 10 of the leg can extend. In cross section, the inner section of the crab leg of the type described above is generally triangular in cross section. The side walls slope upwardly and outwardly in the direction of the outer section. Therefore, preferably the upper edges of the inner walls of support members 24 and 26 are tapered outwardly approximately at the angle at which the walls of the outer shell of the inner section of the crab legs taper to provide a larger surface area in contact with the leg.

Outer section 12 is rotated through elbow 20 to a position over inner section 10 as shown in FIG. 1 to place jaws 16 and 18 of the pincers until the outer ends of the pincers engage the upper surface of lower clamp member 30, which is mounted on support members 24 and 26. Spaced lugs 32 and 34 extend upwardly from base 30 to support pivot pin 36. The pin also extends through downwardly extending lugs 38 and 40 attached to the opposite sides of movable clamp member 42. Spring 44 urges movable clamp member 42 to pivot in a clockwise direction, as viewed in FIG. 1, around pivot pin 36. Attached to movable clamp member 42 is extension 46, which in this embodiment serves as a handle through which force can be exerted to move clamp member 42 in a counterclockwise direction against the force of spring 44.

In operation, movable clamp member 42 is moved upwardly by exerting a downward force on clamp extension 46 to allow the jaws of pincer 14 to be moved into position to engage the upper surface of clamp member 30. Inner section 10 of the crab leg is already positioned between support members 24 and 26, which hold it against downward movement and lateral movement. By releasing clamp member 42 to allow it to engage the spaced jaws 16 and 18 of the pincers, a turning moment is exerted on the entire crab leg urging it further downwardly against support members 24 and 26. The reaction to this turning moment at the points of engagement of the two spaced jaws 16 and 18 with lower clamp member 30 also hold the entire crab leg against rotation around its longitudinal axis.

The leg is now in position to be split longitudinally by a cutting blade. In the embodiment shown, a band saw is employed to split the leg. Blade 50 is moved continuously in one direction in the well-known manner by drive pulleys 52 and 54. The saw blade has teeth on its edge so that it will quickly and easily cut along the longitudinal axis of both sections of the leg simultaneously as the apparatus carrying the leg is moved from left to right, as viewed in FIG. 1. Base 22 and clamp members 30 and 42 are both provided with slots 43 along which saw blade 50 can pass as the apparatus moves the crab leg through the saw. When the saw blade has moved into the space between pincer jaws 16 and 18, the crab leg will be completely split, but will continue to be held by the clamps in engagement with the jaws of the pincers. The movement of the apparatus to the right can be stopped at this time and by releasing clamp 42, the two halves of the leg will fall apart and the apparatus can be retracted in preparation for splitting another crab leg. Guide members 60 and 62 attached to the top of saw table 63 guide the crab holding apparatus as it moves to the right to split a crab leg.

With a blue crab, if the outer section of the leg is pivoted toward the inner section to the full extent allowed by elbow 20, the longitudinal axis of the outer section moves out of alignment with the longitudinal axis of the inner section. Therefore, preferably, clamp member 30 extends above support members 24 and 26 to engage the jaws of the pincers before the leg has been completely folded.

Figure 6:
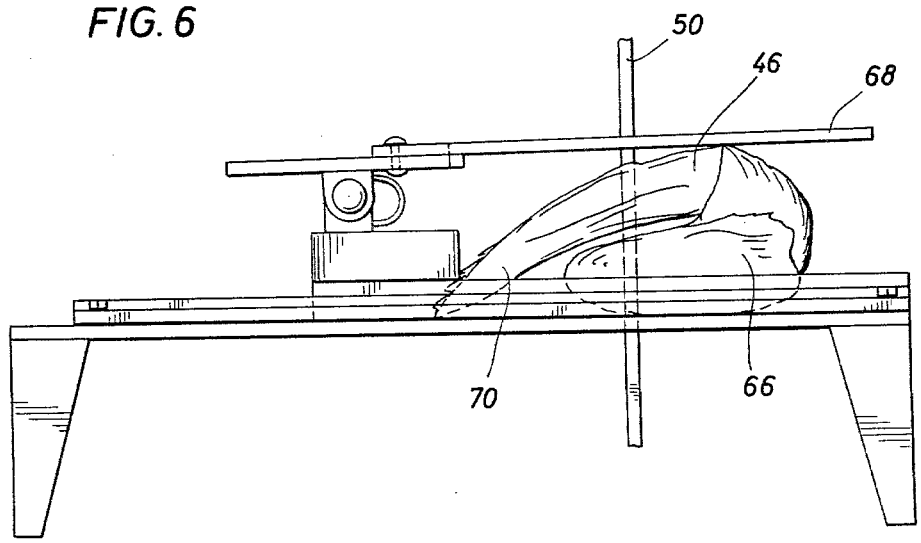
FIG. 6 is the apparatus of FIG. 1 as it is employed to hold the pincer carrying leg of a Dunginess crab for splitting the leg longitudinally into two halves.

In FIG. 6 the same apparatus is employed to hold the pincer carrying leg of a Dunginess crab so that it can be split by saw blade 50. There is a structural difference between a Dunginess crab pincer carrying leg and that of the blue crab described above. The inner section 66 is substantially shorter than outer section 68, which has a more distinct curve to it than the outer section of a blue crab which causes the ends of the jaws of pincers 70 to be more or less in line with the lower edge of inner section 66 of the leg. Therefore, the leg of the Dunginess crab is positioned with the inner section 66 in between support members 24 and 26 in the same manner that the leg of the blue crab was placed between these members. The inner section of the Dunginess crab is also generally triangular in cross section. Therefore, it is well supported against downward and lateral movement by support members 24 and 26. Outer section 68 is folded back over inner section 66 to move the jaws of pincer 70 into the space between support members 24 and 26 so that these members engage the outside surfaces of the spaced jaws of the pincer. Clamp extension member 46 is pivoted around pin 46a into position to extend outwardly over the top of outer section 68 of the leg, as shown in FIG. 6. Spring 44 causes member 46 to exert a downward force on the crab leg holding the leg securely in position against the support members with the spaced jaws of pincer 70 engaging the two support members to hold the crab leg from rotation in the same manner that the spaced jaws 16 and 18 of the blue crab leg held the leg against rotation. With the leg so held, saw blade 50 can press longitudinally through the crab leg, as the supporting apparatus is moved to the right relative to the saw blade to split the crab leg in half.

Figure 5:
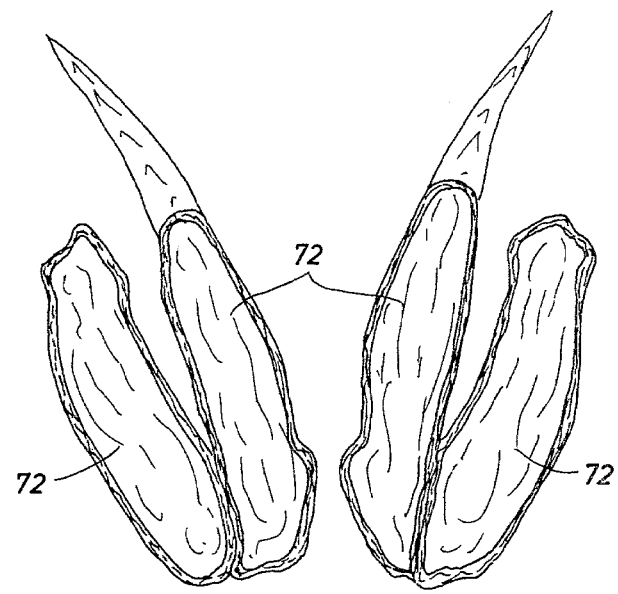
FIG. 5 is a plan view of the two halves of the split leg of a blue crab.

In FIG. 5 a split crab leg is illustrated showing how the meat indicated by the number 72 in the inner and outer sections of the leg is exposed for easy removal.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for holding the type of pincer leg found on crabs of the blue or Dunginess type while the two sections of the leg are cut in half simultaneously along their longitudinal axes to expose the meat in the two sections of the leg for easy removal comprising parallel, spaced support members for engaging the outwardly tapered sides of the inner section of the crab leg and means for engaging the spaced grasping jaws of the pincers of the leg when the outer section of the leg is folded back along the inner section to hold the leg from turning on the support members as the leg is cut in half longitudinally, and means to resiliently hold the inner section in engagement with the support members and the grasping jaws of the pincers in engagement with the pincer jaws engaging means.

2. The apparatus of claim 1 in which the pincer jaws engaging means comprises a surface to engage the outer ends of the jaws of the pincers.

3. The apparatus of claim 2 in which the pincer jaws engaging means comprises spaced members that engage the outside surfaces of the jaws.

4. A method of cutting the type of pincer leg found on crabs of the blue and Dunginess type in half along the longitudinal axes of the two articulated sections of the leg to expose the meat in the two sections for easy removal, comprising the steps of holding the leg from movement in the direction of travel of the cutting blade and from movement laterally thereof, clamping the spaced jaws of the pincers in a plane generally transverse the plane of the cutting blade to hold the leg from rotation around its longitudinal axis, and moving the cutting blade through the leg toward the pincers until the blade moves into the space between the jaws of the pincers to complete the cut.

5. A method of cutting longitudinally in half the pincer leg of a crab of the blue and Dunginess type to expose the meat in the leg for easy removal comprising the steps of placing the leg with the upwardly inclined sides of the inner leg section in engagement with special support members, folding the outer pincers carrying section of the leg over the inner section to position the two jaws of the pincers in a plane generally transverse the longitudinal axis of the inner and outer leg sections and clamping the jaws of the pincers to hold the leg sections from moving relative to the support members and cutting both sections of the leg in half at the same time longitudinally from the elbow to the pincers.

* * * * *